United States Patent [19]

Sprehn et al.

[11] Patent Number: 5,684,907
[45] Date of Patent: Nov. 4, 1997

[54] AEROGEL-CLAD OPTICAL FIBER

[75] Inventors: Gregory A. Sprehn, Livermore; Lawrence W. Hrubesh, Pleasanton; John F. Poco, Livermore; Pamela H. Sandler, San Marino, all of Calif.

[73] Assignee: The Regents of the University of California, Oakland, Calif.

[21] Appl. No.: 332,285

[22] Filed: Oct. 28, 1994

[51] Int. Cl.⁶ ........................................ G02B 6/02
[52] U.S. Cl. ................................ 385/123; 385/125
[58] Field of Search ............................ 385/123–128, 385/115

[56] References Cited

U.S. PATENT DOCUMENTS

| | | | |
|---|---|---|---|
| 3,456,211 | 7/1969 | Koester | 385/125 X |
| 4,787,707 | 11/1988 | Kitayama et al. | 385/128 X |
| 5,148,511 | 9/1992 | Savu et al. | 385/145 |
| 5,208,890 | 5/1993 | Kohler et al. | 385/115 |
| 5,274,734 | 12/1993 | Jin et al. | 385/144 X |
| 5,317,082 | 5/1994 | Beuhler et al. | 385/145 X |

*Primary Examiner*—Phan T. H. Palmer
*Attorney, Agent, or Firm*—Henry P. Sartorio; John P. Wooldridge

[57] ABSTRACT

An optical fiber is surrounded by an aerogel cladding. For a low density aerogel, the index of refraction of the aerogel is close to that of air, which provides a high numerical aperture to the optical fiber. Due to the high numerical aperture, the aerogel clad optical fiber has improved light collection efficiency.

2 Claims, 2 Drawing Sheets

AEROGEL-CLAD OPTICAL FIBER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to optical fibers and more specifically, to high numerical aperture optical fibers.

2. Description of Related Art

Techniques have evolved for efficiently conducting light from one point in space to another via transparent, dielectric fibers. As long as the diameter of these fibers is large compared to the wavelength ($\lambda$) of the radiant energy, the inherent wave nature of the propagation mechanism is of little importance and the process obeys the familiar laws of geometrical optics. On the other hand, if the diameter is of the order of $\lambda$, the transmission closely resembles the manner in which microwaves advance along waveguides. Here the wave nature of light must be reckoned with and this behavior therefore resides in the domain of physical optics.

Consider the straight glass cylinder of FIG. 1 surrounded by air. Light striking its walls from within will be totally internally reflected provided that the incident angle at each reflection is greater than $\theta_c = \sin^{-1} n_a/n_f$, where $n_f$ is the index of the cylinder or fiber. A meridional ray (i.e. one which is coplanar with the optical axis) might undergo several thousand reflections per foot as it bounces back and forth along a fiber until it emerges at the far end. If the fiber has a diameter D and a length L, the path length l traversed by the ray will be $$l = L/\cos\theta_r$$

or from Snell's law $$l = n_f L(n_f^2 - \sin^2\theta_i)^{-1/2} \quad (1)$$

The number of reflection N is then given by $$N = \frac{l}{D/\sin\theta_r} \pm 1$$

or $$N = \frac{L\sin\theta_i}{D(n_f^2 - \sin^2\theta_i)^{1/2}} \pm 1 \quad (2)$$

rounded off to the nearest whole number. The ±1, which depends on where the ray strikes the end face, is of no significance when N is large, as it is in practice. Thus if D is 50 µ, (i.e. 50 microns where 1 µ=$10^{-6}$ m=$39.37 \times 10^{-6}$ in) which is about $2 \times 10^{-3}$ in, (a hair from the head of a human is roughly 50 µin diameter) and if $n_f = 1.6$ and $\theta_i = 30°$, N turns out to be approximately 2000 reflections per foot. Fibers are available in diameters from about 2 µup to 0.25 inch or so but are seldom used in sizes much less than about 10 µ. The large diameter rods are generally called light pipes. Extremely thin glass (or plastic) filaments are quite flexible as witnessed by the well-known fact that glass fibers can even be woven into fabric.

The smooth surface of a single fiber must be kept clean of moisture, dust, oil, etc., if there is to be no leakage of light (via the mechanism of frustrated total internal reflection). Similarly if large numbers of fibers are packed in close proximity, light may leak from one fiber to another in what is known as cross talk. For these reasons, it is now customary to enshroud each fiber in a transparent sheath of lower index called a cladding. This layer need only be thick enough to provide the desired isolation. Typically a fiber core might have an index ($n_f$) of 1.62 and the cladding an index ($n_c$) of 1.52 although a range of values is available. A clad fiber is shown in FIG. 2. Notice that there is a maximum value $\theta_{max}$ of $\theta_i$, for which the internal ray will impinge at the critical angle $\theta_c$. Rays incident on the face at angles greater than $\theta_{max}$ will strike the interior wall at angles less than $\theta_c$. They will only be partially reflected at each such encounter with the core-cladding interface and will quickly lead out of the fiber. Accordingly, $\theta_{max}$ defines the half-angles of the acceptance cone of the fiber. It is determined from $$\sin\theta_c = n_o/n_f = \sin(90 - \theta_t).$$

Thus $$n_o/n_f = \cos\theta_n$$

or $$n_o/n_f = (1 - \sin^2\theta_t)^{1/2}.$$

Making use of Snell's law and rearranging matters provides $$\sin\theta_{max} = \frac{1}{n_o}(n_f^2 - n_c^2)^{1/2}. \quad (3)$$

The quantity $n_o \sin\theta_{max}$ is defined as the numerical aperture or N.A. Its square is a measure of the light gathering power of the system. The term originates in microscopy where the equivalent expression characterizes the corresponding capabilities of the objective lens. It should clearly relate to the speed of the system and, in fact, $$f\# = \frac{1}{2(N.A.)}.$$

Thus for a fiber $$N.A. = (n_f^2 - n_c^2)^{1/2}. \quad (4)$$

The left-hand side of Eq. (4) cannot exceed one and in air ($n_o = 1.00028 \approx 1$) that means that the largest value of N.A. is one. In the case where N.A.=1, the half-angle $\theta_{max}$ equals 90° and the fiber totally internally reflects all light entering its face.

SUMMARY OF THE INVENTION

It is an object of the present invention to provide an aerogel clad fiber-optic having a high numerical aperture.

It is also an object of the invention to provide a method for making an aerogel clad fiber-optic.

An optical fiber is surrounded by an aerogel cladding. The index of refraction of aerogel is close to that of air, i.e., 1, which provides a high numerical aperture to the fiber-optic. Due to the high numerical aperture, the aerogel clad optical fiber has improved light collection and transmission efficiency.

Use of air as cladding around optical fiber is the theoretically ideal way to maximize numerical aperture and therefore collection angle. Suspension of the fiber without touching it and causing scattering has been addressed only through mechanical means that minimize contact, such as spirals, donuts, and springs or coils. The availability of low cost aerogel solves the suspension problem while keeping contact to a minimum.

DETAILED DESCRIPTION OF THE INVENTION

Figure 1:
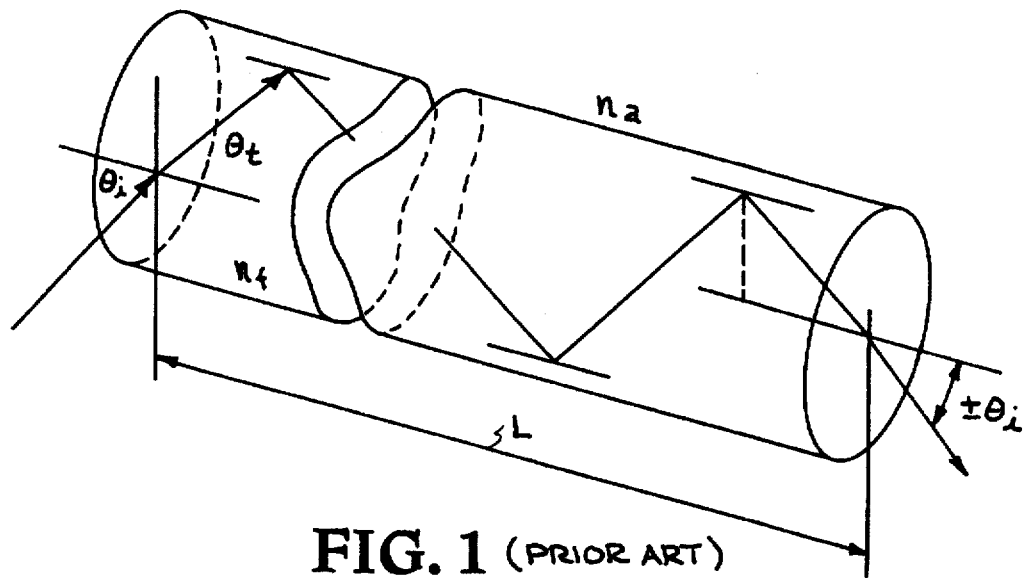
FIG. 1 shows a prior art straight glass cylinder.
Figure 2:
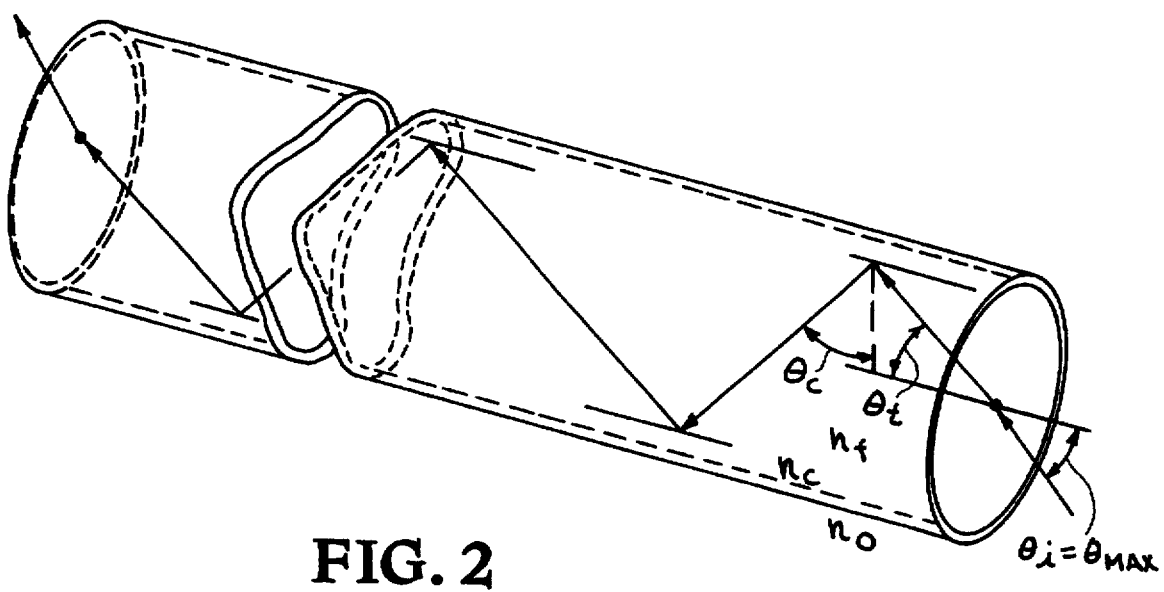
FIG. 2 shows a clad fiber.

The buffer was removed from a 0.48 numerical aperture fiber optic. The cladding and residues were then dissolved off with denatured alcohol, leaving a 1 millimeter (1000 micron) diameter round glass core. This core was cut to about 13 centimeters in length, suspended in a stainless-steel tube about 12 centimeters in length, with an inside diameter of about 6 millimeters, with stainless steel inserts at the ends to hold the fiber and allow outgassing during an autoclave process.

The aerogel was a SiO2 inorganic type, with a density of 0.1 grams per cubic centimeter. This yields an index of refraction very close to that of air, and results in a numerical aperture of the core and aerogel cladding of approximately one.

The ends of the fiber were polished after the aerogel process. Some of the samples were removed from the stainless-steel mold and tested for flexibility, strength and optical properties. The aerogel cladding is somewhat flexible, allowing a bend radius of about 20 centimeters before showing cracks. The appearance of cracks did not seem to reduce the transmission properties of the fiber significantly. The cladding must be at least as thick as five times the wavelength of light desired to be transmitted through the optical fiber. The cladding thickness was about 17.5 micrometers.

The aerogel rubs off, so some sort of sheath or buffer is required. The fibers can be positioned in an instrument and then potted in place during the aerogel process. In this instance, use of high-temperature tolerant and non outgassing supports (for example, glass or stainless-steel) are required in the fiber area. The buffer can be heat shrink, plastic or stainless-steel. The buffer had a thickness of about 182.5 micrometers.

A helium-neon laser beam at 632.8 nanometers was directed to an end of the fiber at incidence angles of from 0 to 90 degrees. Up to about 89 degrees, the laser light was totally transmitted through the fiber and emitted out of the far end. Beyond 89 degrees, the laser could not be accurately directed to impinge the fiber. This test was conducted on aerogel-clad fibers both in and out of the stainless-steel tube, as well as with an unclad core suspended on two razor-blades to duplicate an air-clad comparison.

The light yield of the aerogel-clad fiber was measured in an experiment that delivered an isotropic distribution of photons at the end of the fiber to see if the angle of acceptance of the fiber when pressed up against a Cesium-Iodide scintillator crystal was as good as calculated. The calculations predicted a four-fold increase in the number of photons transmitted from the crystal to a photomultiplier tube. This was confirmed by the experiment. A second batch of fibers was made using a smaller diameter stainless-steel tube (about 3 millimeters) and the results were reproduced. This batch was more flexible, with a bend radius of about 10 centimeters.

In this embodiment, the cladding is silica (SiO2) aerogel and the fiber optic is a straight length located in the center of a tube with the aerogel filling the space between the fiber and the outer wall of the tube. It should be noted that other metal oxide aerogels could be used for this purpose and the procedures will be the same except for the chemicals used in making the gel. Special procedures are needed to insure that the aerogel cladding is monolithic because any cracks will adversely affect the light guiding performance.

Wavelength Shifting fiber (WLS fiber) is used in particle detection. In one configuration, the process starts when blue light is produced in scintillators by incident gamma-rays or charged particles (depending on the type of scintillator). The WLS fiber converts this blue light to green and transports it down the length of the fiber to a photosensitive device for electronic readout. The efficiency of conversion, or the amount of light produced at the end of the fiber, depends on the initial absorption probability and the trapping efficiency in the fiber. The trapping efficiency of the fiber is a function of the angular acceptance of the fiber, and depends on the indices of refraction of the fiber core and cladding. Accordingly, one embodiment of this invention yields the highest amount of light from a WLS fiber by cladding the core in very low density aerogel. The index of refraction of the aerogel is very close to 1.0 and hence the angular acceptance of the fiber is very high, yielding a trapping fraction of 18%, a more than factor of four increase over commercially available WLS fibers. The innovation lies in using aerogel to clad the fiber. The aerogel must be low density to minimize the index of refraction. It must also be organic, since manufacture of inorganic aerogel destroys the plastic WLS fiber core. These fibers are useful in any application involving readout of scintillation detectors for gamma-rays or charged particles. In addition, these fibers can be used for transport of light at right angles from one medium to the small area of a fiber.

Figure 3:
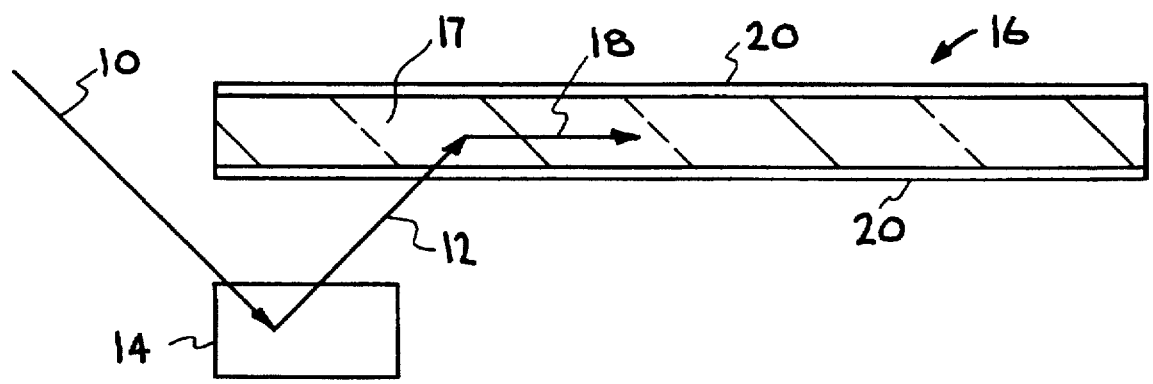
FIG. 3 shows a Wavelength Shifting Fiber.
Figure 4:
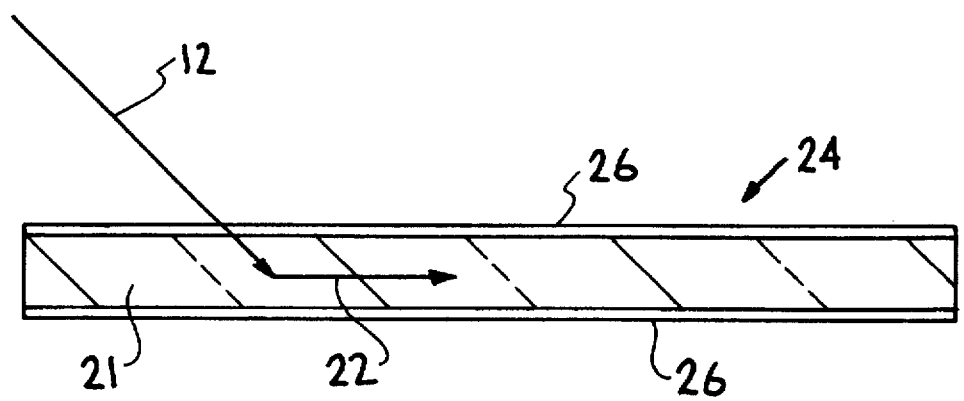
FIG. 4 shows a scintillating fiber.

As shown in FIG. 3, gamma ray photons 10 generate blue photons 12 in a scintillation crystal 14 located in proximity to WLS fiber 16. Blue photons 12 generate green photons 18 in WLS fiber 16 which has a wavelength shifting core 17. Aerogel cladding 20 surrounds WLS fiber 16, increasing the numerical aperture and resulting in an increased light trapping efficiency. A buffer is usually provided. In another embodiment shown in FIG. 4, the core 21 can be any standard fiber material such as silica or a scintillating material, and is surrounded by an aerogel cladding 26. If the core is a scintillating material, blue or green photons 22 are generated from gamma ray photons 12 in fiber 24 which is surrounded by aerogel cladding 26. A buffer is usually provided.

Organic aerogels contain mainly carbon and hydrogen atoms, and thus have a lower average atomic number than silica aerogels. In most other respects (e.g., reaction pathways, microstructure, and properties), they are very similar to the silica aerogels. Several organic aerogels are formed by pyrolyzing resorcinal-formaldehyde at 1100 degrees centigrade. Examples include resorcinal-formaldehyde, melamine-formaldehyde and carbon.

The procedure for making aerogel clad fiber optics requires a fixture designed to hold the fiber optic in a co-axial position relative to an outer sheath that serves as a mold for the gel formation. The fiber optic is located in the center of a tube (e.g. a stainless-steel tube) utilizing centering rings near each end of the tube. Each centering ring has a hole in its center of a diameter slightly larger than the fiber optic so that the fiber slides freely through the hole. Each ring also has additional holes of sizes sufficient to allow liquid to flow through them. The length of the tube should be slightly longer than the fiber optic so that the fiber is totally within the tube length. The length of the tube in one embodiment was 12 inches and the length of the fiber optic was approximately 11.875 inches long. The entire tube assembly, including the fiber supported by the centering rings was then placed vertically inside another tube (e.g. a glass tube) sealed on one end (e.g. with plastic wrap). The length of the glass tube was 13.5 inches.

A chemical solution is made up which, in time, reacts to form a silica gel. This solution is made by mixing two parts: part 1 consists of a silicon bearing compound, tetramethoxysilane (TMOS) (other siliconalkoxides may also be used), and methyl alcohol, together in a molar ratio of (1:5); part 2 consists of a solution of alkaline water and methyl alcohol in a molar ratio of (3:5). Parts 1 and 2 are mixed together, and stirred for 30 minutes at room temperature. The mixture is then poured into the glass tube so that it completely covers and surrounds the fiber optic coaxial assembly, allowing time for the solution to fill the internal space inside the assembly. The open end of the glass tube is then sealed (for example, with a plastic wrap). The entire assembly is allowed to set at room temperature until the solution converts to a gel, typically 90 to 120 minutes. The existence of the gel phase can be tested by momentarily removing the plastic seal and using a thin probe to press the top surface in the glass tube; a gel is indicated by resistance to the probe.

After gelation occurs, the plastic wraps are removed and the tube containing the assembly is quickly placed in another vessel (e.g. glass) containing more methyl alcohol, so that the tube and its contents are totally immersed in the solvent. This container is then placed inside an autoclave pressure vessel for supercritical drying. After being placed within the autoclave, the entire autoclave vessel is filled with methyl alcohol, then sealed. The temperature of the vessel is slowly raised to about 270° C. at a rate of 0.3° C. per minute, during which time the pressure in the autoclave increases to 2000 psi. Excess pressure above 2000 psi is relieved through a valve. After the autoclave has reached the conditions of 270° C. and 2000 psi, the temperature is held constant while the pressure is slowly released at a rate of 5 psi per minute. The heaters are turned off after the pressure reaches about 1.5 atmospheres and the autoclave is allowed to cool while air is purged through the inside of the cooling vessel. The autoclave can then be opened and the glass vessel removed. The entire autoclaving process takes about 48 hours. The inner glass tube containing the coaxial fiber optic assembly is then removed from the outer glass vessel. The fiber optic coaxial assembly is then pushed out of the glass tube and the excess aerogel is wiped from the outside of the stainless steel tube, leaving the coaxial assembly intact.

Changes and modifications in the specifically described embodiments can be carried out without departing from the scope of the invention, which is intended to be limited by the scope of the appended claims.

We claim:

1. An optical fiber, comprising:
   a core: and
   an aerogel cladding fixedly surrounding said core, wherein said aerogel cladding comprises inorganic SiO2 aerogel.

2. An optical fiber, comprising:
   a core: and
   an aerogel cladding fixedly surrounding said core, further comprising a scintillating crystal in proximity to said core, wherein said core comprises a Wavelength Shifting Fiber, and wherein said aerogel comprises an organic aerogel.

* * * * *